(12) United States Patent
Kondo et al.

(10) Patent No.: US 7,080,312 B2
(45) Date of Patent: Jul. 18, 2006

(54) DATA TRANSFORMATION FOR EXPLICIT TRANSMISSION OF CONTROL INFORMATION

(75) Inventors: Tetsujiro Kondo, Kanagawa-prefecture (JP); Yasuhiro Fujimori, Kanagawa-prefecture (JP); William Knox Carey, San Jose, CA (US); James J. Carrig, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 109 days.

(21) Appl. No.: 10/351,732

(22) Filed: Jan. 24, 2003

(65) Prior Publication Data

US 2003/0112875 A1 Jun. 19, 2003

Related U.S. Application Data

(63) Continuation of application No. 09/437,175, filed on Nov. 9, 1999, now Pat. No. 6,539,517.

(51) Int. Cl.
*H03M 13/03* (2006.01)
(52) U.S. Cl. ...................... 714/787; 714/761
(58) Field of Classification Search ........ 714/787–789, 714/761–762, 764, 779, 820–821; 341/63, 341/87; 382/239, 255
See application file for complete search history.

(56) References Cited

U.S. PATENT DOCUMENTS

| | | | | |
|---|---|---|---|---|
| 3,811,108 A | 5/1974 | Howell | ............ | 340/146.01 AL |
| 4,361,853 A | 11/1982 | Remy et al. | | |
| 4,381,519 A | 4/1983 | Wilkinson et al. | .......... | 348/617 |
| 4,394,642 A | 7/1983 | Currie et al. | ............... | 340/347 |
| 4,419,693 A | 12/1983 | Wilkinson et al. | .......... | 348/616 |
| 4,532,628 A | 7/1985 | Matthews | | |
| 4,574,393 A | 3/1986 | Blackwell et al. | | |
| 4,703,351 A | 10/1987 | Kondo | ........................ | 348/415 |
| 4,703,352 A | 10/1987 | Kondo | ........................ | 348/421 |
| 4,710,811 A | 12/1987 | Kondo | ........................ | 348/421 |
| 4,722,003 A | 1/1988 | Kondo | ........................ | 348/421 |
| 4,772,947 A | 9/1988 | Kondo | ........................ | 348/420 |
| 4,788,589 A | 11/1988 | Kondo | ........................ | 348/415 |
| 4,796,299 A | 1/1989 | Hamilton | ..................... | 380/14 |
| 4,809,065 A * | 2/1989 | Harris et al. | .................. | 348/51 |
| 4,815,078 A | 3/1989 | Shimura | ..................... | 714/746 |

(Continued)

FOREIGN PATENT DOCUMENTS

EP  0 359 729 A2  8/1989

(Continued)

OTHER PUBLICATIONS

Translation of Abstract of Japanese Patent No. 61147690.

(Continued)

*Primary Examiner*—Guy J. Lamarre
(74) *Attorney, Agent, or Firm*—Blakely, Sokoloff, Taylor & Zafman LLP

(57) ABSTRACT

The present invention provides a system and method for explicitly transmitting a block attribute in the data of a block. In one embodiment, a current block of data is randomized in accordance with an ID value from the current block and from at least one temporally adjacent block of data. The ID of the current block is selected such that when combined with determined bits of the data results in the value of the block attribute. During a decoding process, the block attribute is retrieved by accessing the determined bits of the data. In one embodiment, the data is then decoded by generating possible candidate decodings and evaluating the candidate decodings based upon confidence metrics.

73 Claims, 8 Drawing Sheets

U.S. PATENT DOCUMENTS

| | | | |
|---|---|---|---|
| 4,845,560 A | 7/1989 | Kondo et al. ............... 348/416 |
| 4,890,161 A | 12/1989 | Kondo ....................... 348/421 |
| 4,924,310 A | 5/1990 | Von Brandt ................ 348/416 |
| 4,953,023 A | 8/1990 | Kondo ....................... 348/409 |
| 5,023,710 A | 6/1991 | Kondo et al. ............... 348/421 |
| 5,065,446 A | 11/1991 | Suzuki et al. ................. 382/56 |
| 5,086,489 A | 2/1992 | Shimura |
| 5,093,872 A | 3/1992 | Tutt |
| 5,101,446 A | 3/1992 | Resnikoff et al. |
| 5,122,873 A | 6/1992 | Golin ........................ 348/390 |
| 5,134,479 A | 7/1992 | Ohishi |
| 5,142,537 A | 8/1992 | Kutner et al. ............... 714/747 |
| 5,150,210 A | 9/1992 | Hoshi et al. |
| 5,159,452 A | 10/1992 | Kinoshita et al. ........... 348/466 |
| 5,166,987 A | 11/1992 | Kageyama |
| 5,177,797 A | 1/1993 | Takenaka et al. |
| 5,185,746 A | 2/1993 | Tanaka et al. |
| 5,196,931 A | 3/1993 | Kondo ....................... 348/420 |
| 5,208,816 A | 5/1993 | Seshardi et al. ............ 714/795 |
| 5,237,424 A | 8/1993 | Nishino et al. ................ 386/40 |
| 5,241,381 A | 8/1993 | Kondo ....................... 348/390 |
| 5,243,428 A | 9/1993 | Challapali et al. |
| 5,247,363 A | 9/1993 | Sun et al. ................... 348/616 |
| 5,258,835 A | 11/1993 | Kato .......................... 348/409 |
| 5,301,018 A | 4/1994 | Smidth et al. |
| 5,307,175 A | 4/1994 | Seachman |
| 5,307,377 A | 4/1994 | Chouly et al. ................. 375/39 |
| 5,321,748 A | 6/1994 | Zeidler et al. |
| 5,327,502 A | 7/1994 | Katata et al. ............... 382/239 |
| 5,337,087 A | 8/1994 | Mishima |
| 5,359,694 A | 10/1994 | Concordel .................. 358/445 |
| 5,379,072 A | 1/1995 | Kondo ....................... 348/441 |
| 5,398,078 A | 3/1995 | Masuda et al. ............. 348/699 |
| 5,406,334 A | 4/1995 | Kondo et al. |
| 5,416,522 A | 5/1995 | Igarashi ..................... 348/416 |
| 5,416,651 A | 5/1995 | Uetake et al. ................ 360/48 |
| 5,416,847 A | 5/1995 | Boze ........................ 381/94.3 |
| 5,428,403 A | 6/1995 | Andrew et al. ............. 348/699 |
| 5,434,716 A | 7/1995 | Sugiyama et al. ............ 360/32 |
| 5,438,369 A | 8/1995 | Citta et al. .................. 348/470 |
| 5,446,456 A | 8/1995 | Seo |
| 5,455,629 A | 10/1995 | Sun et al. |
| 5,469,216 A | 11/1995 | Takahashi et al. .......... 348/441 |
| 5,469,474 A | 11/1995 | Kitabatake |
| 5,471,501 A | 11/1995 | Parr et al. ................... 375/354 |
| 5,473,479 A | 12/1995 | Takahura |
| 5,481,554 A | 1/1996 | Kondo ....................... 714/807 |
| 5,481,627 A | 1/1996 | Kim ........................... 382/254 |
| 5,499,057 A | 3/1996 | Kondo et al. |
| 5,528,608 A | 6/1996 | Shimizume ................ 714/765 |
| 5,557,420 A | 9/1996 | Yanagihara et al. |
| 5,557,479 A | 9/1996 | Yanagihara |
| 5,577,053 A | 11/1996 | Dent |
| 5,583,573 A | 12/1996 | Asamura et al. |
| 5,594,807 A | 1/1997 | Liu |
| 5,598,214 A | 1/1997 | Kondo et al. ............... 348/414 |
| 5,617,333 A * | 4/1997 | Oyamada et al. ........... 709/247 |
| 5,625,715 A | 4/1997 | Trew et al. ................. 382/236 |
| 5,636,316 A | 6/1997 | Oku et al. |
| 5,649,053 A | 7/1997 | Kim |
| 5,663,764 A | 9/1997 | Kondo et al. ............... 348/414 |
| 5,673,357 A | 9/1997 | Shima |
| 5,677,734 A | 10/1997 | Oikawa et al. |
| 5,689,302 A | 11/1997 | Jones |
| 5,699,475 A | 12/1997 | Oguro et al. |
| 5,703,889 A | 12/1997 | Shimoda et al. ............ 714/809 |
| 5,724,099 A | 3/1998 | Hamdi et al. |
| 5,724,369 A | 3/1998 | Brailean et al. |
| 5,737,022 A | 4/1998 | Yamaguchi et al. |
| 5,751,361 A | 5/1998 | Kim |
| 5,751,743 A | 5/1998 | Takazawa ................... 714/774 |
| 5,751,862 A | 5/1998 | Williams et al. ............ 382/260 |
| 5,751,865 A | 5/1998 | Micco et al. ............... 382/296 |
| 5,786,857 A | 7/1998 | Yamaguchi ................. 348/405 |
| 5,790,195 A | 8/1998 | Ohsawa ..................... 348/419 |
| 5,793,432 A | 8/1998 | Mishima et al. ............ 348/423 |
| 5,796,786 A | 8/1998 | Lee ............................ 375/326 |
| 5,805,762 A | 9/1998 | Boyce et al. .................. 386/68 |
| 5,809,041 A | 9/1998 | Shikakura et al. .......... 714/747 |
| 5,809,231 A | 9/1998 | Yokoyama et al. |
| 5,812,146 A | 9/1998 | Sato et al. .................. 345/501 |
| 5,841,781 A | 11/1998 | Takeda |
| 5,841,794 A | 11/1998 | Inoue et al. |
| 5,852,470 A | 12/1998 | Kondo et al. ............... 348/448 |
| 5,861,892 A | 1/1999 | Sato et al. .................. 345/435 |
| 5,861,922 A | 1/1999 | Murashita et al. |
| 5,878,183 A | 3/1999 | Sugiyama et al. |
| 5,903,481 A | 5/1999 | Kondo et al. |
| 5,928,318 A | 7/1999 | Araki ......................... 362/318 |
| 5,933,571 A | 8/1999 | Bannai et al. ............... 386/109 |
| 5,936,674 A | 8/1999 | Kim |
| 5,940,411 A | 8/1999 | Takeda |
| 5,991,450 A | 11/1999 | Ohsawa et al. ............. 382/245 |
| 6,026,190 A | 2/2000 | Astle .......................... 382/232 |
| 6,049,612 A | 4/2000 | Fielder et al. ................. 380/44 |
| 6,067,636 A | 5/2000 | Yao et al. |
| 6,191,710 B1 * | 2/2001 | Waletzki ...................... 341/63 |
| 6,198,851 B1 | 3/2001 | Kato et al. .................. 382/248 |
| 6,229,929 B1 | 5/2001 | Lynch et al. ................ 382/268 |

FOREIGN PATENT DOCUMENTS

| | | |
|---|---|---|
| EP | 0 398 741 A | 11/1990 |
| EP | 0 527 611 | 8/1992 |
| EP | 0 558 016 | 2/1993 |
| EP | 0 566 412 A2 | 4/1993 |
| EP | 0 571 180 A2 | 5/1993 |
| EP | 0 592 196 A2 | 10/1993 |
| EP | 0 596 826 | 11/1993 |
| EP | 0 605 209 A2 | 12/1993 |
| EP | 0 610 587 | 12/1993 |
| EP | 0 597 576 A | 5/1994 |
| EP | 0 651 584 A2 | 10/1994 |
| EP | 0 680 209 | 4/1995 |
| EP | 0 746 157 A2 | 5/1996 |
| EP | 0 818 930 A2 | 7/1997 |
| EP | 0 806 872 A2 | 11/1997 |
| EP | 0 833 517 | 4/1998 |
| EP | 0 851 679 A2 | 7/1998 |
| GB | 2 320 836 A | 11/1997 |
| JP | 7-67028 | 3/1995 |
| JP | 09200757 | 1/1996 |
| WO | WO96/07987 | 9/1995 |
| WO | WO99/21285 | 10/1998 |
| WO | 99 21090 A | 4/1999 |
| WO | WO99/21369 | 4/1999 |
| WO | WO 99/21369 | 4/1999 |
| WO | WO 01/01702 A1 | 1/2001 |

OTHER PUBLICATIONS

Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.

Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.
Kondo, et al., "*Adaptive Dynamic Range Coding Scheme For Future HDTV Digital VTR*", Fourth International Workshop on HDTV and Beyond, Sep. 4-6, Turin, Italy.
Kondo, et al., "*A New Concealment Method For Digital VCR's*", IEEE Visual Signal Processing and Communication, pp. 20-22, Sep. 1993, Melbourne, australia.
Park, et al., "*A Simple Concealment For ATM Bursty Cell Loss*", IEEE transactions of Consumer Electronics, No. 3, Aug. 1993, pp. 704-709.
Tom, et al., "*Packet Video for Cell Loss Protection Using Deinterleaving and Scrambling*", ICASSP 91: 1991 International conference on Acoustics, Speech and Signal Processing, vol. 4, pp. 257-2860, Apr. 1991.
NHK Laboratories Note, "*Error Correction, Concealment and Shuffling*", No. 424, Mar. 1994, pp. 29-44.
Translation of Japanese Patent #7-67028, 30 pgs.
Kondo, et al., "*Adaptive Dynamic Range Coding Algorithm for A Digital VCR*", pp. 219-226.
Kim, et al., "*Bit Rate Reduction Algorithm For A Digital VCR*", IEEE Transactions on Consumer Electronics, vol. 37, No. 3, Aug. 1, 1992, pp. 267-274.
R.C. Gonzalez, et al., "*Digital Image Processing*", Addison Wesley Publishing Company, Inc., 1992, pp. 67-88.
R. Aravind, et al., "*Image and Video Coding Standards*", AT&T Technical Journal Jan./Feb. 1993, pp. 67-88.
Zhu, et al., "*Coding and Cell-Loss Recovery in DCT-Based Packet Video*", IEEE Transactions on Circuits and Systems for Video Technology, Jun. 3, 1993, No. 3, NY.
International Search Report, PCT/US98/22347, Mar. 16, 1999, 2 pgs.
International Search Report, PCT/US95/22531, Apr. 1, 1999, 1 pg.
International Search Report, PCT/US98/22411, Feb. 25, 1999, 1 pg.
International Search Report, PCT/US98/22412, Oct. 5, 1999, 5 pgs.
International Search Report, PCT/US00/03595, 6 pgs., Feb. 10, 2000.
Jeng, et al., "*Concealment Of Bit Error And Cell Loss In Inter-Frame Coded Video Transmission*", 1991 IEEE, 17.4.1-17.4.5.
Monet, et al., "*Block Adaptive Quantization Of Images*", IEEE 1993, pp. 303-306.
International Search Report PCT/US00/03738, Feb. 11, 2000, 9 pgs.
Stammnitz, et al., "*Digital HDTV Experimental System*", pp. 535-542.
International Search Report PCT/US00/03508, Feb. 9, 2000, 8 pgs.
Chu, et al., Detection and Concealment of Transmission Errors in H.261 Images, XP-000737027, pp. 74-84, IEEE transactions, Feb. 1998.
Park, et al., "Recovery of Block-coded Images from Channel Errors", p. 396-400, pub. Date May 23, 1993.
International Search Report PCT/US00/03439, Feb. 9, 2000, 8 pgs.
International Search Report PCT/US00/03595, Feb. 10, 2000, 6 pgs.
International Search Report PCT/US00/03611, Feb. 10, 2000, 8 pgs.
International Search Report PCT/US00/03599, Feb. 10, 2000, 4 pgs.
International Search Report PCT/US00/03742, Feb. 11, 2000, 5 pgs.
International Search Report PCT/US00/03654, Feb. 10, 2000, 4 pgs.
International Search Report PCT/US00/03299, Feb. 9, 2000, 5 pgs.
Meguro, et al., "*An Adaptive Order Statistics Filter Based On Fuzzy Rules For Image Processing*", pp. 70-80, XP-00755627, 1997 Scripta Technica, Inc.
International Search Report PCT/US00/03743, 4 pgs., Feb. 11, 2000.
International Search Report PCT/US00/15679, 7 pgs., Oct. 24, 2000.
International Search Report PCT/US00/14331, 7 pgs., Oct. 9, 2000.
International Search Report PCT/US00/14245, Sep. 15, 2000, 9 pgs.
King Ip chan, et al., XP-002131882, "*Block Shuffling On Top Of Error Concealment For Wireless Image Transmissions*", pp. 977-981, 1996 IEEE.
Huifang Sun, et al., "*Error Concealment Algorithms for Robust Decoding Of MPEP Compressed Video*", Apr. 19, 1995, pp. 250-267.
Richard Brush, XP-002075974, "Video Data Shuffling For The 4:2:2 DVTR", SMPTE Journal Oct. 1996, pp. 1009-1016.
Chan, et al., *Block Shuffling And Adaptive Interleaving For Still Image Transmission Over Rayleigh Fading Channels*, May 1999, vol. 48, IEEE Transactions on Vehicular Technology, p. 1002-1011.
Kondo, et al., New ADRC for Consumer Digital VCR, p. 144-150, 1990, 8th International Conference; Video, Audio and Data Recording.
Calgar, et al., *New Efficient Shuffled Block Transform Design Technique*, Electronics Letters, vol. 30, No. 11, May 26, 1994.

* cited by examiner

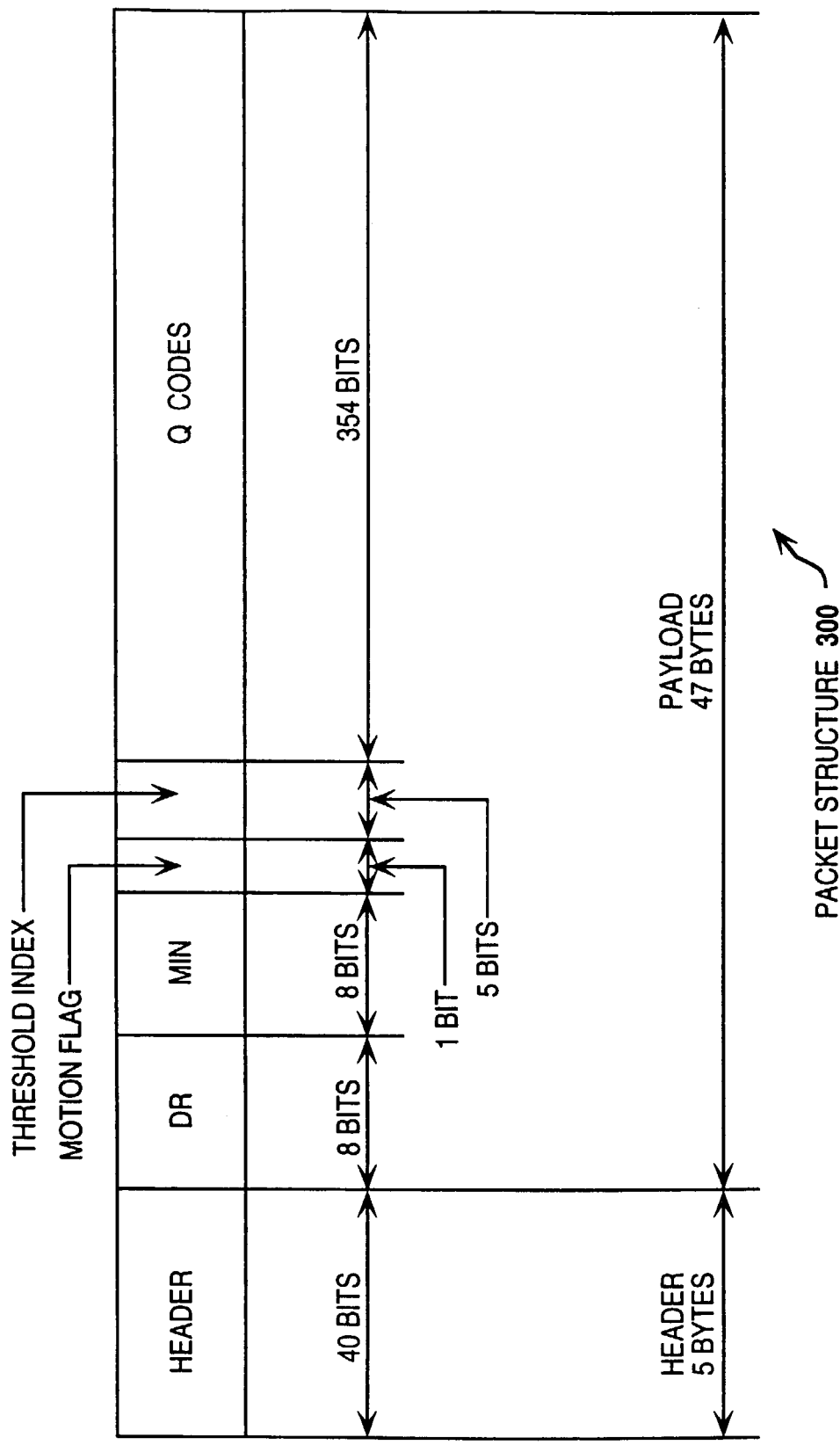

DATA TRANSFORMATION FOR EXPLICIT TRANSMISSION OF CONTROL INFORMATION

RELATED APPLICATIONS

This is a continuation of application Ser. No. 09/437,175, now U.S. Pat. No. 6,539,517, filed on Nov. 9, 1999.

BACKGROUND OF THE INVENTION

1. Field of the Invention

The present invention relates to providing a robust error recovery due to data losses incurred during transmission of signals. More particularly, the present invention relates to a method of transformation of data to explicitly transmit control information.

2. Art Background

A number of techniques exist for reconstructing lost data due to random errors that occur during signal transmission or storage. However, these techniques cannot handle the loss of consecutive packets of data. Consecutive loss of packets of data is described in the art as burst error. Burst errors result in a reconstructed signal with such a degraded quality that it is easily apparent to the end user. Additionally, compression methodologies used to facilitate high speed communications compound the signal degradation caused by burst errors, thus adding to the degradation of the reconstructed signal. Examples of burst error loss affecting transmitted and/or stored signals may be seen in high definition television ("HDTV") signals, mobile telecommunication applications, as well as video storage technologies including video disk and VCRs.

For example, the advent of HDTV has led to television systems with a much higher resolution than the current standards proposed by the National Television Systems Committee ("NTSC"). Proposed HDTV signals are predominantly digital. Accordingly, when a color television signal is converted for digital use it is common that the luminance and chrominance signals may be digitized using eight bits. Digital transmission of NTSC color television signals may require a nominal bit rate of about two-hundred and sixteen megabits per second. The transmission rate is greater for HDTV, which may nominally require about 1200 megabits per second. Such high transmission rates may be well beyond the bandwidths supported by current wireless standards. Accordingly, an efficient compression methodology is required.

Compression methodologies also play an important role in mobile telecommunication applications. Typically, packets of data are communicated between remote terminals in mobile telecommunication applications. The limited number of transmission channels in mobile communications requires an effective compression methodology prior to the transmission of packets. A number of compression techniques are available to facilitate high transmission rates.

Adaptive Dynamic Range Coding ("ADRC") and Discrete Cosine Transform ("DCT") coding provide image compression techniques known in the art. Both techniques take advantage of the local correlation within an image to achieve a high compression ratio. However, an efficient compression algorithm may result in compounded error propagation because errors in an encoded signal are more prominent when subsequently decoded. This error multiplication may result in a degraded video image that is readily apparent to the user.

In the ADRC process, for example, the image to be compressed is divided into disjoint sets of pixels called blocks. Information can then be transmitted in a block by block manner. For each block, a minimum pixel level and maximum pixel level are determined. The range of pixel values between the minimum and maximum level, referred to herein as the dynamic range (DR), is then divided into equally sized sections, referred to herein as quantization bins. Thus the number of bins is variable. If the dynamic range is divided into $2^Q$ quantization bins, the transmission of the approximate pixel values is referred to as Q bit quantization.

Each pixel in the block is approximately transmitted to the decoder based on which of the quantization bins it falls into. The number of the quantization bin the pixel falls into is the Qcode for the pixel. The Qcode is subsequently provided to a decoder can approximate the pixel value using block control information and the Qcode. The control information, also referred to herein as fixed length data, includes the number of quantization bins, the minimum pixel value and dynamic range of the block. Decoding becomes quite difficult if the block control information is lost during transmission to the decoder. In certain instances, the lost block control information can be reconstructed at the decoder. For example, the control information typically transmitted with an encoded block of data includes the dynamic range, motion flag and the minimum value or maximum value or central value. Q is not typically transmitted to save on the required number of bits transmitted as Q is determined from the dynamic range in the same way that the encoder determines Q. However, if the dynamic range is lost, Q can not be determined in a straightforward manner. Typically, in such cases, Q is estimated using available information.

One solution to this problem is to explicitly transmit the Q value for each block. However, it is desirable to minimize the number of bits transmitted in the encoded bitstream.

SUMMARY OF THE INVENTION

The present invention includes a system and method that explicitly transmits at least one block attribute as part of the encoded data without adding bits to the encoded bitstream. In one embodiment, the block attribute is explicitly transmitted as part of the encoded data, located at determined bit locations of the encoded data. The bits in these determined positions are transformed so that they correspond to the value of a particular block attribute. In one embodiment, these bits are set to equal the block length. A decoder can therefore read the block attribute directly from the bitstream. In order to transmit the bits in the determined bit locations, the previous values of these bits must be overwritten. To recover these original bits, in one embodiment, the encoder performs a transformation on the remaining bits in the block which allows the decoder to recover the original bits that were over-written by block attribute data.

BRIEF DESCRIPTION OF THE DRAWINGS

The objects, features and advantages of the present invention will be apparent to one skilled in the art in light of the following detailed description in which:

FIG. 3 illustrates one embodiment of a packet structure.

DETAILED DESCRIPTION

Figure 1A:
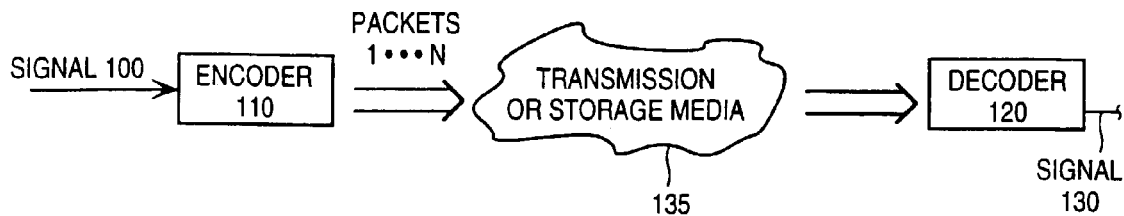
FIG. 1a illustrates an embodiment of the processes of signal encoding, transmission, and decoding.

The present invention provides a system and method for the transformation of a signal stream to explicitly code control data, such as block attributes for a block of data, without adding additional bits to the bitstream. In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The signal processing methods and structures are described in the context of one embodiment in which the signals are Adaptive Dynamic Range Coding (ADRC) encoded images, and block attributes or compression constants utilized for encoding. However, it is contemplated that the present invention is not limited to ADRC encoding and the particular compression constants utilized; rather it will be apparent that the present invention is applicable to different compression technologies, different types of correlated data, including, but not limited to, sound data and the like, and different control data, block attributes or compression constants including, but not limited to, the minimum value (MIN), maximum value (MAX) central value (CEN), dynamic range (DR), and quantization number Qbit (Q) which may be used in ADRC processes.

The present invention is also applicable to different types of ADRC processes including edge-matching and non edge-matching ADRC. For further information regarding ADRC, see "Adaptive Dynamic Range Coding Scheme for Future HDTV Digital VTR", Kondo, Fujimori, Nakaya, Fourth International Workshop on HDTV and Beyond, Sep. 4–6, 1991, Turin, Italy. ADRC has been established as a feasible real-time technique for coding and compressing images in preparation for constant bit-rate transmission.

In the above paper, three different kinds of ADRC are explained. In one embodiment, these are achieved according to the following equations:

Non-edge-matching ADRC:

$$DR = MAX - MIN + 1$$

-continued $$q = \left\lfloor \frac{(x - MIN + 0.5) \cdot 2^Q}{DR} \right\rfloor$$

$$x' = \left\lfloor \frac{(q + 0.5) \cdot DR}{2^Q} + MIN \right\rfloor$$

Edge-matching ADRC:

$$DR = MAX - MIN$$

$$q = \left\lfloor \frac{(x - MIN) \cdot (2^Q - 1)}{DR} + 0.5 \right\rfloor$$

$$x' = \left\lfloor \frac{q \cdot DR}{2^Q - 1} + MIN + 0.5 \right\rfloor$$

Multi-stage ADRC:

$$DR = MAX - MIN + 1$$

$$q = \left\lfloor \frac{(x - MIN + 0.5) \cdot 2^Q}{DR} \right\rfloor$$

$$x' = \left\lfloor \frac{(q + 0.5) \cdot DR}{2^Q} + MIN \right\rfloor$$

Where MAX' is the averaged value of x' in the case of $q=2^Q-1$;

MIN' is the averaged value of x' in the case of q=0; and $$DR' = MAX' - MIN'$$

$$q = \left\lfloor \frac{(x - MIN') \cdot (2^Q - 1)}{DR'} + 0.5 \right\rfloor$$

$$x' = \left\lfloor \frac{q \cdot DR'}{2^Q - 1} + MIN' + 0.5 \right\rfloor$$

where MAX represents the maximum level of a block, MIN represents the minimum level of a block, x represents the signal level of each sample, Q represents the number of quantization bits (also referred to herein as the Qbit value), q represents the quantization code (encoded data), x' represents the decoded level of each sample, and the square brackets ⌊•⌋ represent a truncation operation performed on the value within the square brackets.

The signal encoding, transmission, and subsequent decoding processes are generally illustrated in FIG. 1a. Signal 100 is a data stream input to Encoder 110. Encoder 110 follows the Adaptive Dynamic Range Coding ("ADRC") compression algorithm and generates Packets 1, . . . N for transmission along Transmission Media 135. Decoder 120 receives Packets 1, . . . N from Transmission Media 135 and generates Signal 130. Signal 130 is a reconstruction of Signal 100.

Figure 1B:
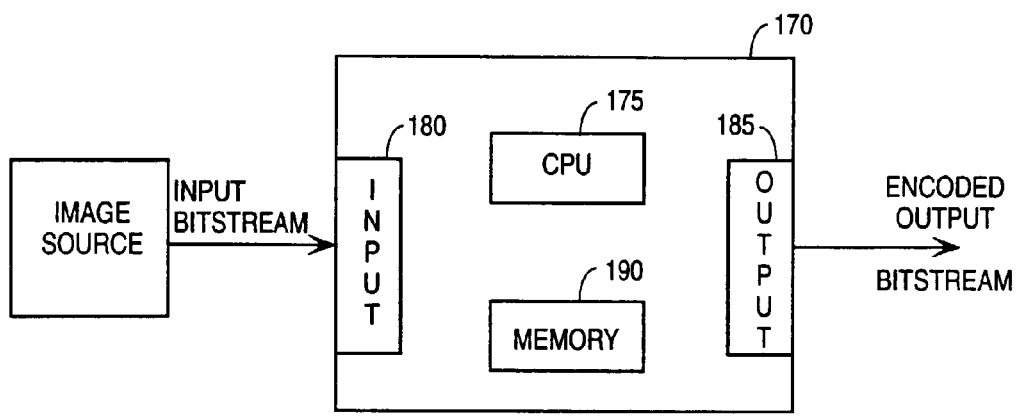
FIGS. 1b and 1c illustrate embodiments of signal encoding, transmission, and decoding implemented as software executed by a processor.
Figure 1C:
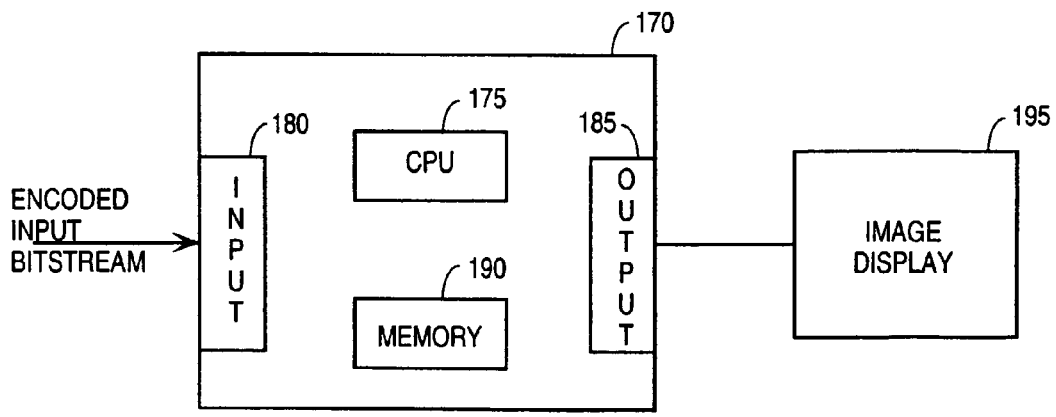
Figure 1D:
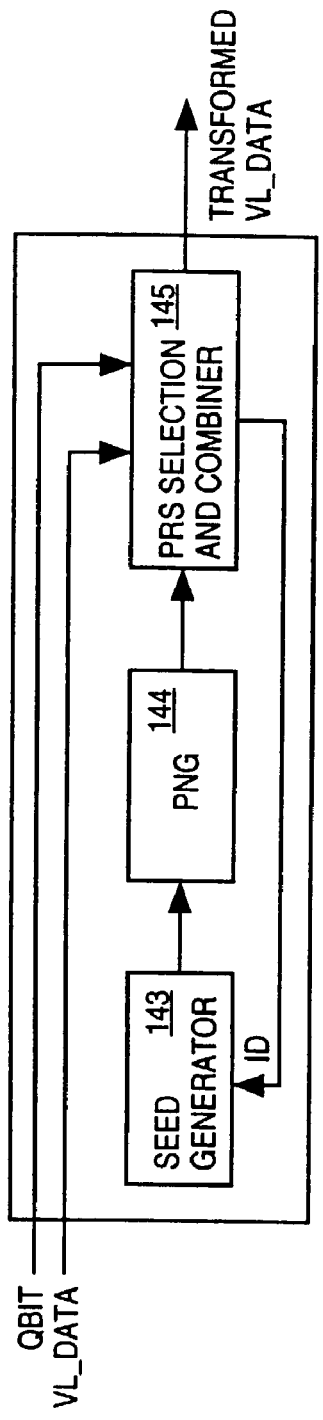
FIGS. 1d and 1e illustrate embodiments of signal encoding, transmission, and decoding implemented as hardware logic.
Figure 1E:
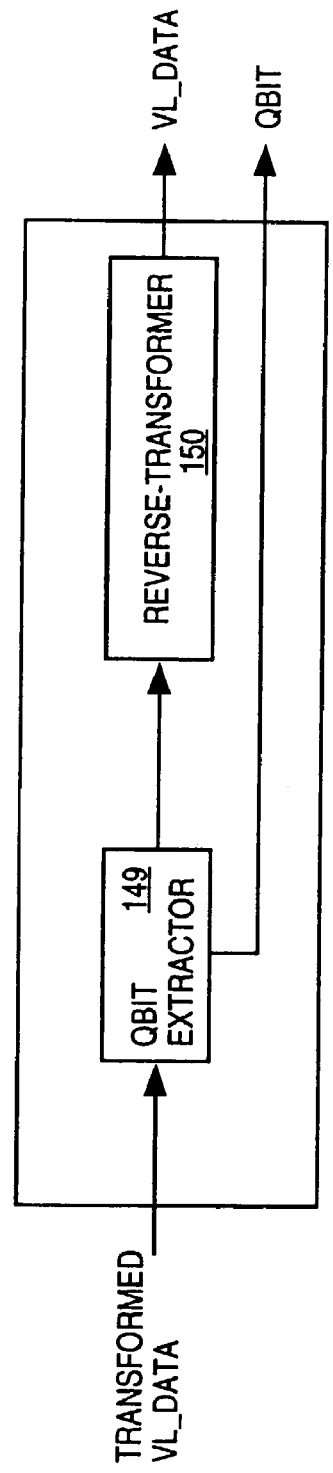

Encoder 110 and Decoder 120 can be implemented a variety of ways to perform the functionality described herein. In one embodiment, Encoder 110 and/or Decoder 120 may be embodied as software stored on media and executed by a general purpose or specifically configured computer system, typically including a central processing unit, memory and one or more input/output devices and co-processors, as shown in FIGS. 1b and 1c. Alternately, the Encoder 110 and/or Decoder 120 may be implemented as logic to perform the functionality described herein, as shown in FIGS. 1d and 1e. In addition, Encoder 110 and/or Decoder 120 can be implemented as a combination of hardware, software or firmware.

Embodiments of the circuits for coding, arranging, and the transformation of a signal stream to provide for a robust error recovery are shown in FIGS. 1b and 1c. The methods described herein may be implemented on a specially configured or general purpose processor system 170. Instructions are stored in memory 190 and accessed by processor 175 to perform many of the steps described herein. Input 180 receives the input bitstream and forwards the data to processor 175. Output 185 outputs the data. In FIG. 1b, the output may consist of the encoded data. In FIG. 1c, the output may consist of the decoded data, such as image data decoded according to the methods described, sufficient to drive an external device such as display 195.

In one embodiment, Signal 100 may be a color video image comprising a sequence of video frames, each frame including information representative of an image in an interlaced video system. Each frame is composed of two fields, wherein one field contains data of the even lines of the image and the other field containing the odd lines of the image. The data includes pixel values that describe the color components of a corresponding location in the image. For example, in the present embodiment, the color components consist of the luminance signal Y, and color difference signals U, and V. It is readily apparent the process of the present invention can be applied to signals other than interlaced video signals. Furthermore, it is apparent that the present invention is not limited to implementations in the Y, U, V color space, but can be applied to images represented in other color spaces.

In alternate embodiments, Signal 100 may be, for example, two-dimensional static images, hologram images, three-dimensional static images, video, two-dimensional moving images, three dimensional moving images, monaural sound, or N-channel sound.

Referring back to FIG. 1a, Encoder 110 divides the Y, U, and V signals and processes each group of signals independently in accordance with the ADRC algorithm. The following description, for purposes of simplifying the discussion, describes the processing of the Y signal; however, the encoding steps may be replicated for the U and V signals.

In one embodiment, Encoder 110 groups Y signals across two subsequent frames, referred to herein as a frame pair, of Signal 100 into three dimensional blocks ("3D") blocks. In an alternate embodiment, a 3D block is generated from grouping two 2D blocks from the same localized area across a given frame pair, wherein a two dimensional 2D block is created by grouping localized pixels within a frame or a field. It is contemplated that the process described herein can be applied to different block structures. Although the discussion herein discusses specific block structures, the term "block" is applicable to any grouping of data to be encoded.

In one embodiment, for a given 3D block, Encoder 110 calculates whether there is a change in pixel values between the 2D blocks forming the 3D block. A Motion Flag is set if there are substantial changes in values. As is known in the art, use of a Motion Flag allows Encoder 110 to reduce the number of quantization codes when there is localized image repetition within each frame pair. Encoder 110 also detects the maximum pixel intensity value ("MAX") and the minimum pixel intensity value ("MIN") within a 3D block.

Using values MAX and MIN, Encoder 110 calculates the dynamic range ("DR") for a given 3D block of data. For one embodiment DR=MAX−MIN+1 in the case of non-edge-matching ADRC. For edge-matching ADRC, DR=MAX−MIN. In some embodiments the encoder may also determine a central value (CEN) that has a value between MAX and MIN. In one embodiment, CEN may be determined as CEN=MIN+DR/2.

In an alternative embodiment, Encoder 110 encodes signals on a frame by frame basis for a stream of frames representing a sequence of video frames. In another embodiment, Encoder 110 encodes signals on a field by field basis for a stream of fields representing a sequence of video fields. Accordingly, Motion Flags are not used and 2D blocks may be used to calculate the MIN, MAX, CEN and DR values.

In one embodiment, Encoder 110 references the calculated DR against a threshold table of DR threshold values and corresponding Qbit values to determine the number of quantization bits ("Qbits") used to encode pixels within the block corresponding to the DR. Encoding of a pixel or datapoint results in a quantization code ("Q code"). The Q codes are the relevant compressed image data used for storage or transmission purposes. Thus the Qbit value may be indicative of the length of the block.

In one embodiment, the Qbit selection is derived from the DR of a 3D block. Accordingly, all pixels within a given 3D block are encoded using the same Qbit, resulting in a 3D encoded block. The collection of Q codes, MIN, Motion Flag, and DR for a 3D encoded block is referred to as a 3D ADRC block. Alternately, 2D blocks are encoded and the collection of Q codes, MIN, and DR for a given 2D block results in 2D ADRC blocks. As noted earlier, the MAX value and CEN value may be used in place of the MIN value. In addition, as discussed below, in one embodiment, the Q codes are configured to explicitly transmit the Qbit value.

A number of threshold tables can be implemented. In one embodiment, the threshold table consists of a row of DR threshold values. A Qbit corresponds to the number of quantization bits used to encode a range of DR values between two adjacent DRs within a row of the threshold table. In an alternative embodiment, the threshold table includes multiple rows and selection of a row depends on the desired transmission rate. Each row in the threshold table is identified by a threshold index. One description of an example of ADRC encoding and buffering is disclosed in U.S. Pat. No. 4,722,003 entitled "High Efficiency Coding Apparatus" and U.S. Pat. No. 4,845,560 also entitled "High Efficiency Coding Apparatus", assigned to the assignee of the present invention.

Here forth the Q codes are referred to as variable length data ("VL-data"). In addition, the DR, MIN, MAX, CEN and Motion Flag are referred to as block attributes. Selected block attributes, also referred to herein as compression parameters, together with the threshold index, constitute the fixed length data ("FL-data"). Furthermore, in view of the above discussion, the term block attribute may describe a parameter associated with a component of a signal element, wherein a signal element includes multiple components.

An advantage of not including the Qbit code value in the FL-data and using DR to derive the Qbit value is that no additional bits need be transmitted for each ADRC block. A disadvantage of not including the Qbit value is that, if the DR is lost or damaged during transmission or storage, the Q codes cannot be easily recovered. The ADRC decoder must determine how many bits were used to quantize the block without relying on any DR information.

However, in one embodiment, the Qbit value may be sent explicitly by causing determined bits (also referred to herein as an intermediate set of bits) of the VL-data to be the Qbit value. In one embodiment, the VL-data is encoded such that the determined bits correspond to the Qbit value. For example, the VL-data is transformed such that when the VL-data is combined with a number, that includes at the determined bit locations a value referred to herein as the ID, the determined bits equal the Qbit value. More particularly, in one embodiment, after the VL-data is transformed by an exclusive-OR operation with a pseudorandom sequence and the determined bits of the transformed data are set, if necessary to equal the Qbit value.

Figure 2A:
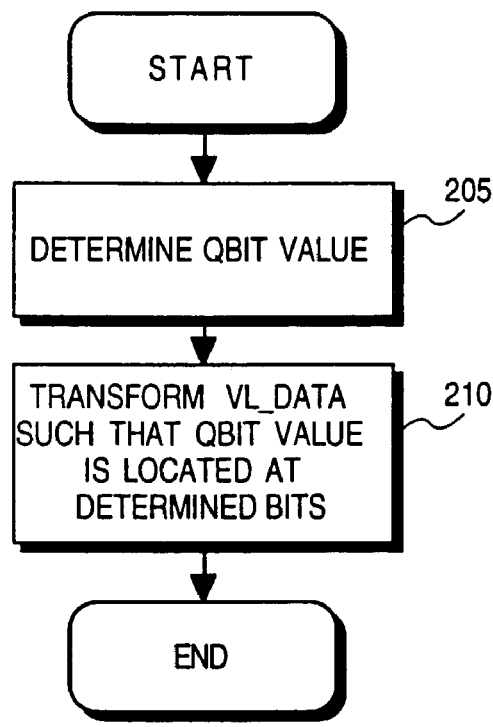
FIG. 2a illustrates one embodiment of a process for transforming data to explicitly transmit control information.
Figure 2B:
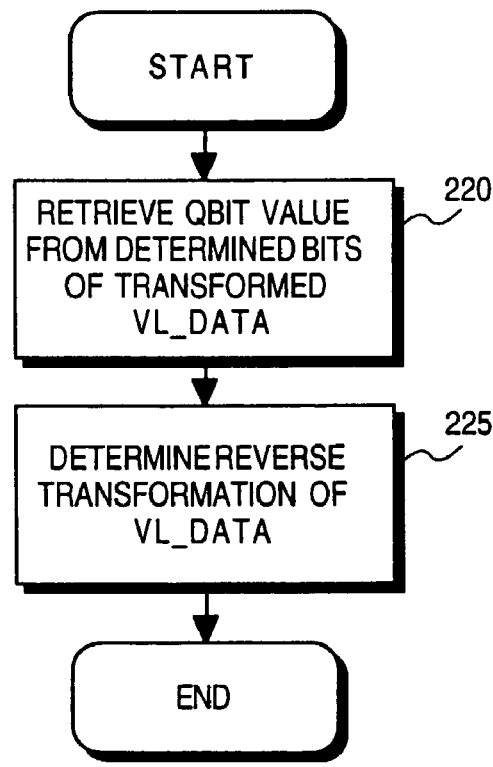
FIG. 2b illustrates one embodiment for retrieving control information and determining the data from the transformed data.

One embodiment of the process is illustrated in FIG. 2a. At step 200, the Qbit value is determined. At step 210, the VL-data is transformed such that the Qbit value is located at determined location of the transformed VL-data. FIG. 2b illustrates one embodiment of the process for retrieving the Qbit value and determining the VL-data. At step 220, the Qbit value is retrieved from determined bits of the transformed VL-data. At step 230 the VL-data is then determined from the transformed data received.

The VL-data can be transformed in a number of ways. As used herein, the term "transform" is contemplated to include, but is not limited to, translation, randomization, reorganization and shuffling of data. In one embodiment, the ID of a current block of data, together with the IDs of a number of previous blocks, may be used as a randomizing or seed value for a pseudorandom number generator (PNG). In one embodiment, the three previous ID values may be used. However, any number of temporally adjacent values (either prior or subsequent) may be used to generate the seed value. For purposes of discussion herein, temporally adjacent may be construed to include any prior or subsequent block of data.

In one embodiment, each successive ID value is concatenated to the right of the current seed value. The PNG creates a statistically distinct pseudorandom number sequence using the seed value and creates the same statistically distinct sequence for each application of the same seed value. The pseudorandom number sequence may then be used to transform the VL-data. If the transformed data at the determined bit locations is not equal to the desired Qbit value, the bits are set to the Qbit value.

In alternate embodiments, the FL-data may be transformed or both the VL-data and FL-data may be transformed. As noted above, in one embodiment, the transformation T of the VL-data is achieved by applying a bitwise XOR (exclusive OR) function to the pseudorandom number sequence (p) and the VL-data (x). Thus:

$T(x) = x \oplus p.$

In this embodiment, the bitwise XOR function is used, as the inverse transformation is exactly the same as for the original, forward transformation. That is:

$T^{-1}(T(x)) = (x \oplus p) \oplus p = x.$

In alternate embodiments, a variety of sets of transformations may be used to generate the statistically distinct sequences. For example, a table of fixed or pre-defined sequences may be used.

In one embodiment, the PNG creates multiple pseudorandom sequences. The number of sequences corresponds to the number of possible Qbit values. In one embodiment, the seed value, (seed value+$2^n$+1), (seed value+$2^n$+2 ...), (seed value+$2^n$−n−1) are used as inputs for generating possible pseudorandom sequences for explicitly transmitting a Qbit value of n bits. For example, in one embodiment in which the Qbit value is 2 bits in length, the seed value, seed value+4, seed value+5, and seed value+6 are used as inputs to the PNG to generate four pseudorandom sequences.

The pseudorandom sequences are then combined, for example exclusive-ORed, to produce a transformed value. If the determined bits do not correspond to one possible Qbit value, the determined bits are set to correspond to a possible Qbit value. For example, in one embodiment, the determined bits of each pseudorandom sequence are set to a value such that when the modified pseudorandomed sequence is combined with the VL-data, the result includes one possible Qbit value at the determined bits. A pseudorandom sequence may be selected based upon the Qbit value to be transmitted.

As the Qbit information is explicitly transmitted at determined bit locations of the bitstream, the Qbit value can be easily retrieved by accessing the determined bit locations.

In one embodiment, a similar process is used to determine the VL-data from the transformed data. In one embodiment, the decoder attempts to decode the block with possible ID values and associated possible seed values. The possible or candidate seed values are input to the PNG to produce pseudorandom sequences. The decoder produces candidate decodings of the VL-data by applying a bitwise XOR function to each pseudorandom number sequence to produce VL-data candidate decodings. A local correlation metric is applied to each candidate decoding, and a confidence metric is computed for the block.

In one embodiment, the decoder implements a delayed-decision decoder that delays the dequantization by four blocks. In one embodiment, if the decoder calculates four consecutive low confidence metrics, it may conclude that the decoding of the oldest block was incorrect. The decoder may then return to the candidate seed value used for the oldest block and try the next-most-likely decoding of the oldest block. The decoder may then re-derandomize the three most recent blocks using a second guess at a seed value. This process may continue until the decoder produces a sequence of four decoded blocks in which the most recent block's confidence metric is large.

Thus, in one embodiment, the Qbit value may be explicitly transmitted in the VL-data. In alternate embodiments, any data may be explicitly transmitted in the VL-data. For example, the Motion Flag or a combination of the Qbit value and the Motion Flag may be encoded into the VL-data.

One embodiment of a circuit for coding a signal stream to provide for a robust error recovery is shown in FIG. 1d. Elements 143, 144 and 145 function as a transformer to transform the input signal to data that explicitly contains the Qbit value without increasing the number of bits required. An input signal of data and corresponding Qbit value is received. The seed generator 143 generates seed values for input to the PNG 144. The PNG 144 generates a sequence for each seed value provided. As discussed above, a plurality of seed values are provided to generate a plurality of sequences, which when individually combined with the data produces transformed data that includes one possible Qbit value at the determined bit locations in the transformed data. Selector logic 145 combines the sequences and data and selects the transformed data that contains the corresponding Qbit value at the determined location in the transformed data to use. The output may be used as the Q code to be transmitted or stored or may be further encoded or transformed in accordance with the particular coding process utilized. Furthermore, prior to the transformation discussed above, in some embodiments, the data may have been encoded or transformed in accordance with a particular encoding process used.

FIG. 1e illustrates an embodiment of a circuit for recovering lost or damaged DR values. An input signal is received and the Qbit is extracted by reading the bits at the determined location of the bitstream by Qbit extractor 149. Derandomizer logic 150 derandomizes the Q codes from the input bitstream. In some embodiments, the input signal may have been decoded and/or transformed in accordance with a particular encoding process; alternately or additionally, the output signal from the derandomization logic 150 may be further decoded and/or transformed.

For illustrative purposes, the following description provides for a ⅙ consecutive packet transmission loss tolerance, pursuant to an ADRC encoding and shuffling of a video signal. Accordingly, the following definition and division of components exist for one embodiment. Other embodiments also are contemplated. A data set may include a partition of data of a video or other type of data signal. Thus, in one embodiment, a frame set may be a type of data set that includes one or more consecutive frames. A segment may include a memory with the capacity to store a one-sixth division of the Q codes and block attributes included in a frame set. Further, a buffer may include a memory with the capacity to store a one-sixtieth division of the Q codes and block attributes included in a frame set. The shuffling of data may be performed by interchanging components within segments and/or buffers. Subsequently, the data stored in a segment may be used to generate packets of data for transmission. Thus, in the following description, if a segment is lost all the packets generated from the segment are lost during transmission. Similarly, if a fraction of a segment is lost then a corresponding number of packets generated from the segment are lost during transmission.

Although, portions of the following description may refer to a ⅙ consecutive packet loss for data encoded using ADRC encoding, it is contemplated that the methods and apparatus described herein are applicable to a design of a 1/n consecutive packets loss tolerance coupled to a variety of encoding/decoding schemes.

FIG. 3 illustrates one embodiment of packet structure 300 used for the transmission of the data across point-to-point connections as well as networks. packet structure 300 is generated by encoder 110 and is transmitted across transmission media 135. For one embodiment, packet structure 300 comprises five bytes of header information, eight DR bits, eight MIN bits, a Motion Flag bit, a five bit threshold index, and 354 bits of Q codes. In an alternate embodiment, the MIN bits may be replaced with CEN bits. The packet structure described herein is illustrative and may typically be implemented for transmission in an asynchronous transfer mode ("ATM") network. However, the present invention is not limited to the packet structure described and a variety of packet structures that are used in a variety of networks can be utilized.

Figure 4:
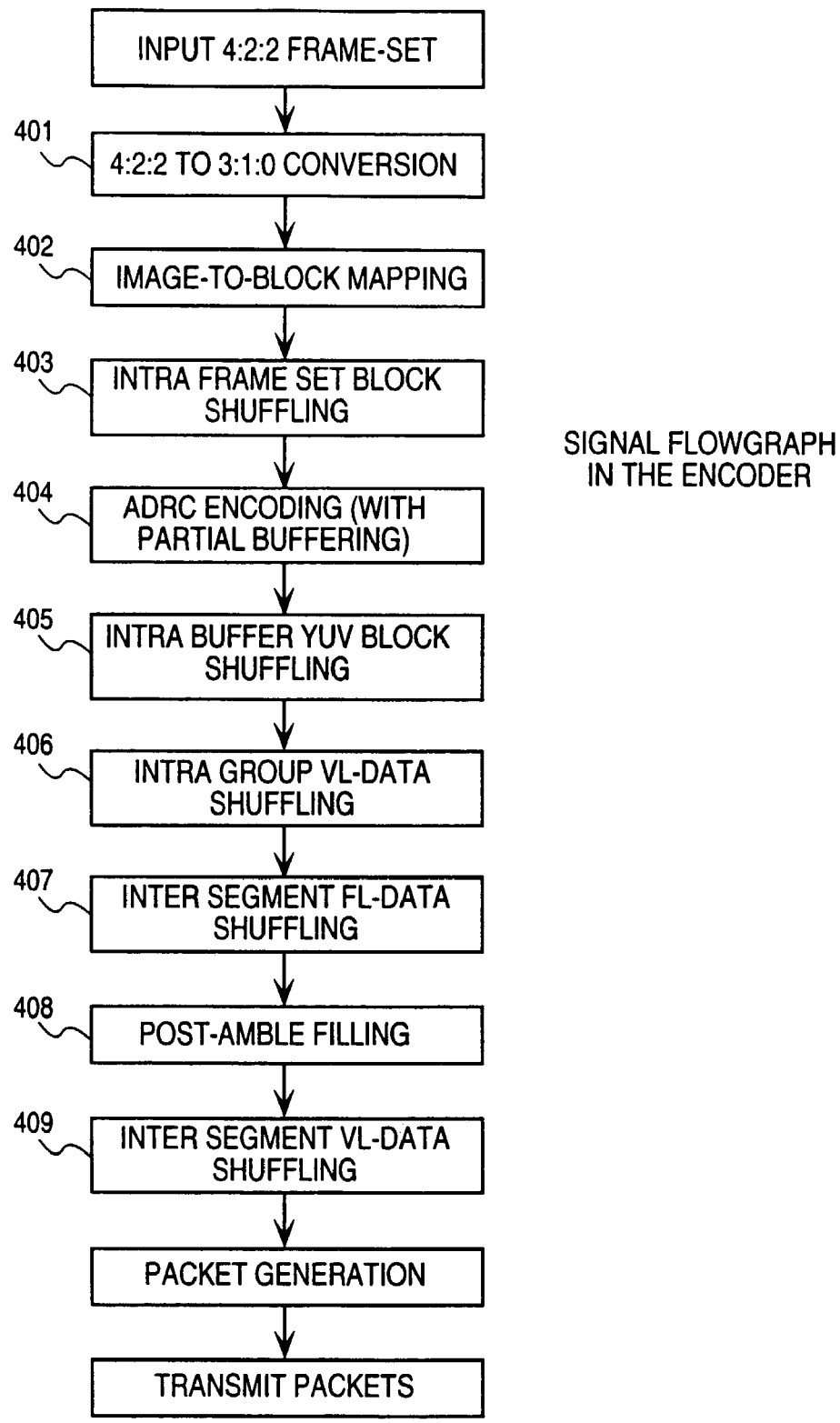
FIG. 4 is a flow diagram illustrating one embodiment of the encoding process.

FIG. 4 is a flow diagram illustrating one embodiment of an encoding process performed by Encoder 110.

In step 401 of FIG. 4, an input frame set, also referred to as a display component, may be decimated to reduce the transmission requirements. The Y signal is decimated horizontally to three-quarters of its original width and the U and V signals are each decimated to one-half of their original height and one-half of their original width. This results in a 3:1:0 video format with 3960 Y blocks, 660 U blocks and 660 V blocks in each frame pair. As noted earlier, the discussion will describe the processing of Y signals; however, the process is applicable to the U and V signals. At step 402, the two Y frame images are mapped to 3D blocks. At step 403, 3D blocks are shuffled. At step 404, ADRC buffering and encoding is used. As part of this step, the Q code for each block is transformed in order to explicitly transmit the corresponding Qbit value.

At step 405, encoded Y, U and V blocks are shuffled within a buffer.

At step 406, the VL-data for a group of encoded 3D blocks and their corresponding block attributes are shuffled. At step 407, the FL-data is shuffled across different segments. At step 408, post-amble filling is performed in which variable space at the end of a buffer is filled with a predetermined bitstream. At step 409, the VL-data is shuffled across different segments. For further information regarding this embodiment, see PCT application no.: PCTUS98/22347 assigned to the assignee of the present invention.

Figure 5:
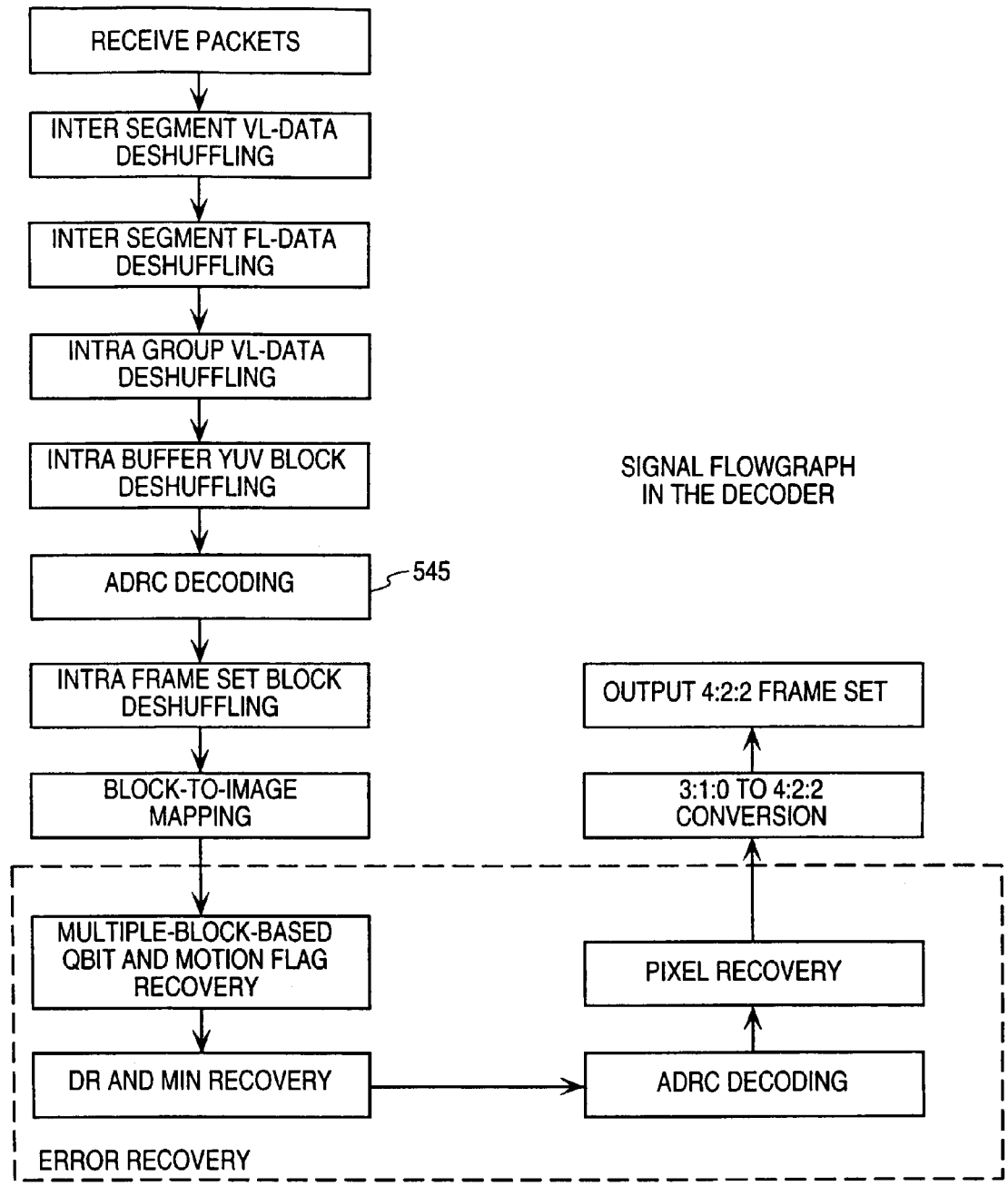
FIG. 5 is a flow diagram illustrating one embodiment of the decoding process.

FIG. 5 is a flow diagram illustrating one embodiment of a decoding process performed by decoder 120. The conversion and de-shuffling processes may be the inverse of the processes represented in FIG. 4. However, in one embodiment, the Qbit extraction and reverse transformation of Q codes as described herein may be performed within step 545.

As discussed above, the Qbit value may be explicitly transmitted in the VL-data. In one embodiment, randomization is used to encode the Q code in a manner to subsequently recover the derandomized Q code including those bits replaced with the Qbit value prior to transmission.

Randomization may be applied to destroy the correlation of incorrect candidate decodings that may be generated during a subsequent data decoding process in order to estimate lost or damaged data. The randomization process does not change the properties of the correct candidate decoding, as it is restored to its original condition. In particular, by utilizing randomization across multiple blocks of data, subsequent derandomized data will tend to result in candidate decodings that exhibit highly correlated properties indicative that the corresponding candidate decoding is a good selection.

The randomization process is chosen such that a correct derandomization results in candidate decoding exhibiting highly correlated properties and an incorrect derandomization results in a decoding exhibiting uncorrelated properties. In addition, the time-varying randomization advantageously handles zero blocks. In one embodiment, time-varying randomization may decrease the likelihood that the decoder will miss data errors by resynchronization (i.e., the decoder incorrectly decoding a set of blocks then correctly decoding subsequent blocks without recognizing the error). Encoding parameters may be used to perform the randomization and derandomization processes. For example, a randomization pattern may be chosen based on the values of the compression parameters.

In one embodiment, $Q_i$ is the Qbit value used to quantize a given VL-data block $x_i$. In one embodiment, this number may be 0, 1, 2, 3, or 4. In one embodiment, a seed value may be used to initialize a pseudorandom number generator (PNG) to create a plurality of pseudorandom number sequences. This seed value may vary with the current ID value, on a block-by-block basis. In alternate embodiments, the seed value may be used to generate any suitable mathematical transformation sequence.

In alternate embodiments, the seed value may be generated by the combination of a variety of compression constants to encode the block of data.

Figure 6:
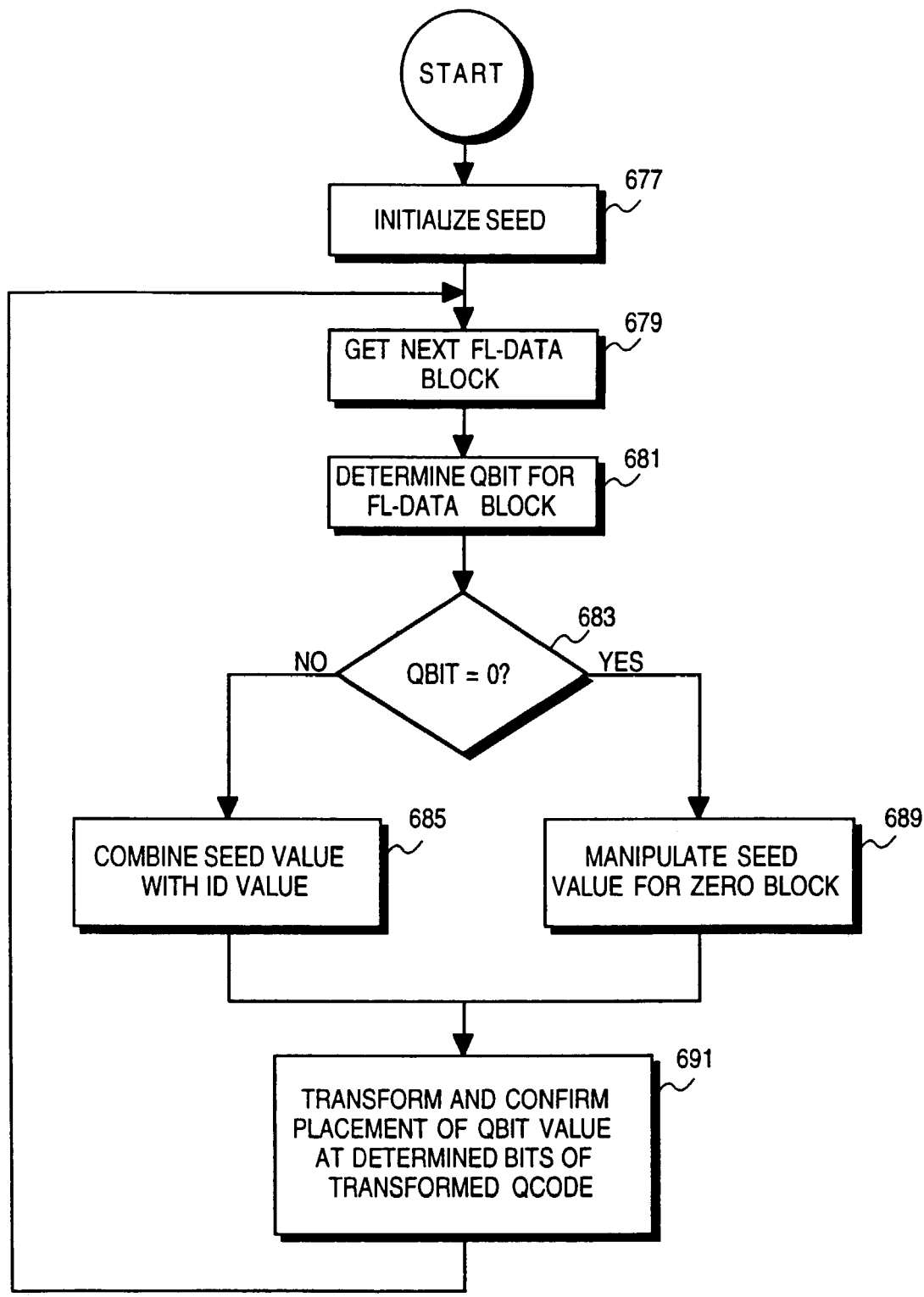
FIG. 6 is a flowchart of one embodiment for a process for transforming data to explicitly include control information.

FIG. 6 illustrates one embodiment of method for encoding VL-data blocks by time-varying randomization and explicitly encoding the Qbit value. Initially at step 677, the seed value may be set to zero. Other initial values may also be used. In one embodiment, the seed value is an 8-bit binary number (e.g., 00000000).

Next, at step 679, the next VL-data block is retrieved. Then at step 681, the Qbit value for the VL-data block is determined. In one embodiment, the Qbit value may be determined directly from the DR. In an alternate embodiment, a Qbit value previously determined by the encoder may be used and stored in a data buffer. Next at step 683, if the Qbit value is not equal to zero, the process continues at step 685. If the Qbit value is equal to zero, the process continues at step 689.

If at step 683, Qbit value is not zero, then at step 685, the seed value is combined with the ID value. In one embodiment, the seed value is shifted left by a number of bits, e.g., two bits. Then the seed value may be combined, for example, concatenated, with the binary equivalent of the determined bits of the ID value minus one. (For example, if the current seed value is 00000010 and the binary equivalent of ID value minus one is 11, the two steps result in a seed value of 00001011.) Processing then continues at step 691.

If, at step 683, the Qbit value is zero, then, at step 689, the seed value is manipulated to indicate a zero block. In one embodiment, the seed value is shifted right one bit. (For example, if the current seed value is 00001011, the result of the right shift is a seed value of 00000101.) In alternate embodiments, the seed value may be set to a specified constant, left shifted in some manner, or manipulated in any advantageous manner.

At step 691, the VL-data is randomized in accordance with the seed value. In one embodiment, the seed value is used to generate a pseudorandom number sequence using the PRG. A given PRG always generates the same pseudorandom number sequence using the same seed value. Then, the pseudorandom number sequence is used as a transformation function of the VL-data block. In one embodiment, the VL-data may be randomized by applying a bitwise XOR (exclusive OR) function to the VL-data and the pseudorandom number sequence. If the determined bits of the resultant randomized VL-data does not equal one of the possible Qbit values, the determined.

As an example, a sequence of Qbit values and ID values for successive temporally adjacent blocks of data may be as follows:

$Q_1=1, Q_2=1, Q_3=3, Q_4 32\ 0, \ldots$ $ID_1=2, ID_2=1, ID_3=1, ID_4=2, \ldots$ The Qbit may be a value between 0 and 3. The seed value is initially set to 00000000, (corresponding to step 677). The first VL-data block, $x_1$, is retrieved and $Q_1$ is determined. In this example, $Q_1$ has a value of 2. The Qbit value is not zero, therefore, steps 685 and 687 are executed. The seed value is shifted left two bits, resulting in the seed value 00000000. For block one, $ID_1=2$ (determined from the equation Qbit=$VL_{d0, d1} \oplus ID$., where d0, d1 correspond to determined bits of the VL-data which are coded with the Qbit value), which has a binary value of 10. The two values are concatenated resulting in a seed value of 00000010.

The seed value is then used to generate four pseudorandom number sequences $yJ_1$, where J corresponds a possible Qbit value between 1 and 4. In one embodiment J is equal to (Qbit−1). Therefore four pseudorandom sequences are generated: one having a value of 00 encoded at the determined bit locations, one having a value of 01 encoded at the determined bit locations, one having a value of 10 encoded at the determined bit locations, and one having a value of 11 encoded at the determined bit locations. In one embodiment, the four pseudorandom sequences are generated using the following values as input to the PNG: (seed*4), (seed*(4+1)), (seed*(4+2)), (seed*(4+3)). In one embodiment, if the determined bits of the pseudorandom sequence (i.e., the ID) does not equal J, the determined bits are set to equal J.

One sequence of the four is selected to be combined with the VL-data. In one embodiment, the sequence is selected to be the one, which when combined with the VL-data, includes data at the determined bit locations corresponding to the Qbit value. Thus, in one embodiment, one of the four sequences is selected that produces the Qbit (i.e., Qbit-1), at the determined bit locations when bitwise XORed with the VL_data, $x_1$.

The next VL-data block, $x_2$, and its Qbit value, $Q_2$ (value 2), are retrieved. For block two, $ID_2=1$, which has a binary value of 01. The current seed value is shifted left two bits, resulting in 00001000. The two values are concatenated resulting in a new seed value of 00001001. The new seed value is then used to generate four pseudorandom number sequence $syJ_2$ and the selected sequence is bitwise XORed with $x_2$.

The next VL-data block, $x_3$, and its Qbit value, $Q_3$ (value 1), are retrieved. For block three, $ID_3-1=0$, which has a binary value of 00. The current seed value is shifted left two bits, resulting in 00100000. The two values are concatenated resulting in a new seed value of 00100100. The new seed value is then used to generate four pseudorandom number sequences $yJ_3$ and the selected sequence is bitwise XORed with $x_3$.

The next VL-data block, $x_4$, and its Qbit value, $Q_4$ (value 0), are retrieved. Because the Qbit value is 0 (a zero block), the seed value is shifted to the right one bit, corresponding to step 689. This results in a new seed value of 00010010. The new seed value is then used to generate four pseudorandom number sequences $yJ_4$ and the selected sequence is bitwise XORed with $x_4$.

The transformed data resulting from the combination operation, for example, the bitwise XOR operation, is used to generate packets of data. For one embodiment, packets are generated, according to packet structure 300, and transmitted across Transmission media 135. The data received is subsequently decoded. Lost or damaged data may be recovered using data recovery processes.

In the present embodiment, the Qbit value is explicitly transmitted, such that the value is simply retrieved from the packet. The VL-data is, one embodiment, recovered from the bitstream using the derandomization process described below.

Randomization, and the subsequent derandomization of data, may be applied to destroy the correlation of incorrect candidate decodings that may be generated during the data decoding process in order to estimate lost or damaged data. The derandomization process does not change the properties of the correct candidate decoding, as it is restored to its original condition. Derandomized data will tend to result in a candidate decoding that exhibits highly correlated properties indicating that the corresponding candidate decoding is a good selection.

The derandomization process may result in candidate decodings exhibiting highly correlated properties and an incorrect derandomization may result in a decoding exhibiting uncorrelated properties. In addition, the time-varying derandomization advantageously handles zero blocks. In one embodiment, the time-varying randomization may decrease the likelihood that the decoder will miss data errors by resynchronization (i.e., the decoder incorrectly decoding a set of blocks then correctly decoding subsequent blocks without recognizing the error). Encoding parameters may be used to perform the derandomization processes. For example, a derandomization pattern may be chosen based on the values of the compression parameters. In one embodiment, the pattern chosen is based upon ID values.

In one embodiment, the decoder attempts to decode the block with all possible ID values and associated possible randomizing or seed values to generate candidate decodings. In this embodiment, a local correlation metric is applied to each candidate decoding and a confidence metric is computed for the block.

In one embodiment, the Qbit value is determined from the determined bits of the received bitstream. An encoded block of data is extracted from the received bitstream based upon the determined block length which is determined from the Qbit value. Candidate blocks are generated using a set of transformations. One of the candidate blocks is then selected based upon a correlation measure.

In one embodiment, the dequantization of the block may be delayed as the decoder implements a delayed-decision decoder. In one embodiment, the delayed-decision decoder delays the decoding of the data by four blocks. If the decoder calculates four, consecutive low confidence metrics, it concludes that the decoding of the oldest block was incorrect. In that case, an alternate decoding, for example, the next most likely decoding is then evaluated. In one embodiment, the three more recent blocks are derandomized using the alternate guess at seed value used for derandomization. This process continues until a sequence of four decoded blocks are produced wherein the most recent block's confidence metric is greater than a given threshold value $\tau$.

Figure 7:
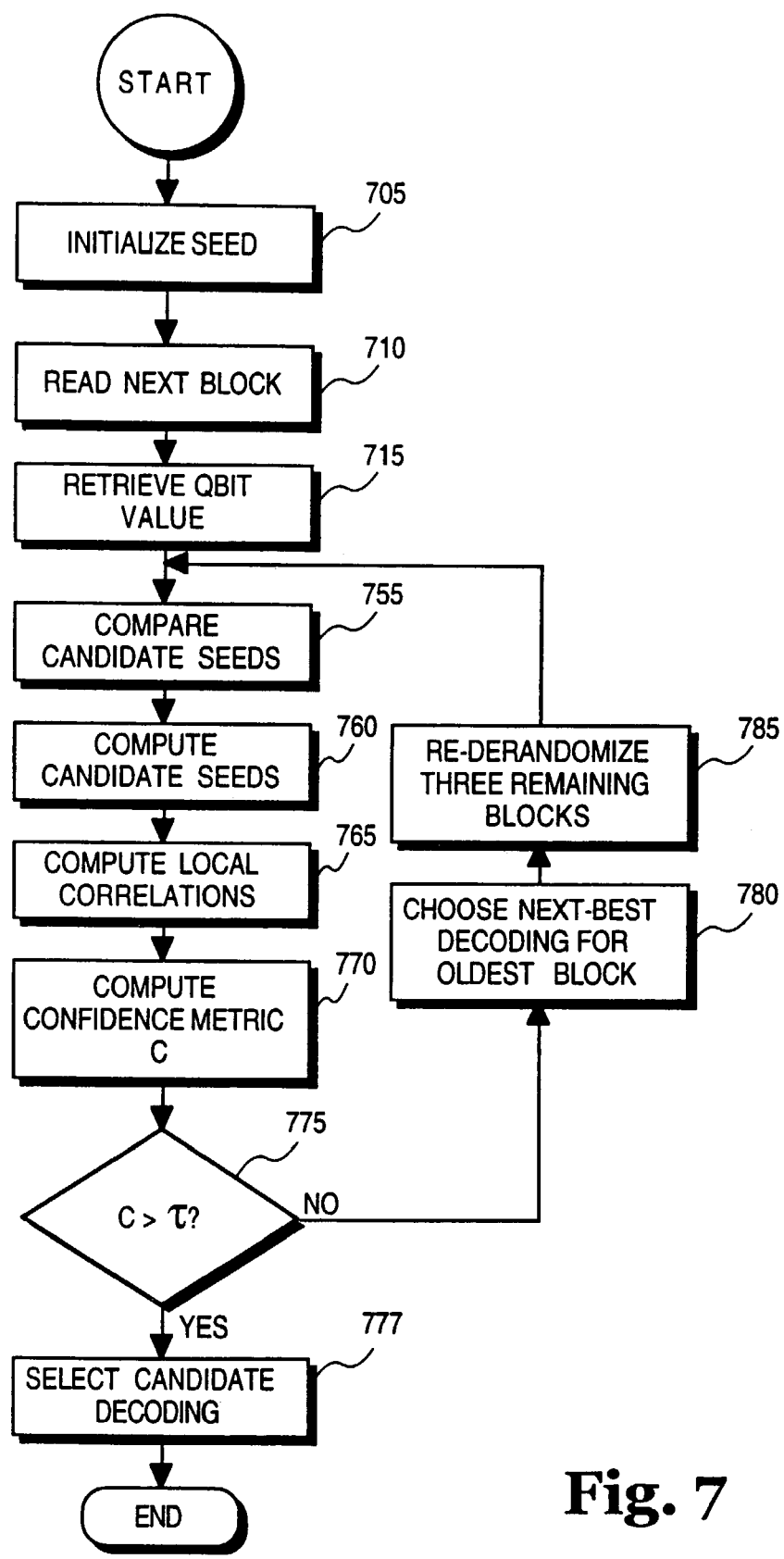
FIG. 7 is a flowchart of one embodiment for a process for reverse-transforming data and extracting explicitly included control information.

FIG. 7 is a flowchart of one embodiment for decoding. In this embodiment, the time-varying derandomization of VL-data blocks using a seed value is utilized. Initially at step 705, a seed value is set to zero. In one embodiment, the seed value is an 8-bit binary number (e.g., 00000000).

At step 710 the next VL-data block is retrieved. At step 715, the Qbit value is retrieved from the determined bit locations of the received data.

At step 755, all possible candidate seed values for the current block are computed. In one embodiment, all five possible candidate seed values are computed from the current seed value for the current VL-data block. In this embodiment, the five possible seed values may be:

seed0=seed>>1 seed1=(seed<<2)|0x0 seed2=(seed<<2)|0x1 seed3=(seed<<2)|0x2 seed4=(seed<<2)|0x3 where "seed" is the seed value as it existed prior to the application of the process to the current block, << and >> represent left shift and right shift operations, respectively, and | represents a concatenation function. The first value is for the zero block in which the seed value is sifted right 1 bit.

Next, at step 760, the current block is derandomized using all possible seed values. The derandomization of the randomized values using each possible seed value may be viewed as a reverse process of the randomization processing discussed with respect to FIG. 6. Then, at step 765, the correlation's of the possible seed values are computed.

The computation of correlation values may be determined using a variety of methods including, but not limited to, least squares estimates, linear regression, or any suitable method. One method of determining correlation values is described in more detail in "Source Coding To Provide For Robust Error Recovery During Transmission Losses," PCT application No. PCTUS98/22347 assigned to the assignee of the present invention.

Next, at step 770, using a candidate seed value, the confidence metric for the block if determined. If at step 775, the confidence metric $c_i$ is above a threshold $\tau$, the candidate decoding of the current VL-data block is used, step 720.

However, if the confidence metric $c_i$ is below the threshold $\tau$, then processing continues at step 780. At step 780, the confidence metric for the oldest block retained in memory is examined. In one embodiment, up to four blocks may be maintained. Thus, in this embodiment, the confidence metric $c_{i-3}$ is examined. If the confidence metric for the oldest block is less than $\tau$, then, at step 780, an alternate or next-best decoding for the oldest block and is utilized.

At step 785, the remaining three blocks in memory are re-derandomized based on the new alternate seed value utilized to generate the next-best decoding in step 780. A process similar to that performed to generate candidate decodings is used. Processing then returns to step 755 and steps 780 through 785 are repeated until the confidence metric of the most recent block, $c_i$, is greater than $\tau$.

In one embodiment, a confidence metric determines when the local correlation metric has failed to produce the correct decoding from among the possible candidate decodings. In one embodiment, the most likely decoding candidate for correlation-based decoding exhibits higher correlation properties as compared to the next-most-likely decoding candidate. The confidence metric is a numerical measurement of the degree to which the best candidate exhibits the higher correlation for any given block. In one embodiment, the decoder performs every possible candidate decoding and then attempts to determine the appropriate decoding based on local correlation. In this embodiment, the decoder determines a confidence metric based on the two most likely decodings, i.e., the two decodings that exhibit the largest local correlation. This metric indicates the degree to which the most likely decoding is superior to the next-most-likely decoding.

In one embodiment, a decoding that produces no clearly superior choice based on the local correlation structure in the block would have a low confidence metric. Blocks in which there is one decoding that produces a much larger correlation than any of the other possible decodings would have a large confidence metric. In one embodiment, if the decoder computes n consecutive low confidence metrics then it would conclude that a decoding error occurred in the decoding of the oldest block.

For example, if the decoder determines the correlations (C) of four derandomized blocks as follows:

| | |
|---|---|
| $C_{-3}$ | low |
| $C_{-2}$ | low |
| $C_{-1}$ | high |
| $C_0$ | high |

(where $C_0$ is the most recently derandomized block and $C_{-3}$ is the oldest derandomized block), then decoder may assume that block −3 was correctly derandomized.

If decoder determines the correlations of the four derandomized blocks as follows:

| | |
|---|---|
| $C_{-3}$ | high |
| $C_{-2}$ | low |
| $C_{-1}$ | low |
| $C_0$ | low, | decoder may not make a determination if block −2, −1, and 0 are correctly decoded until decoder derandomized the next block.

If the next block derandomized has a high correlation, the correlations of the four derandomized blocks may be as follows:

| | |
|---|---|
| $C_{-3}$ | low |
| $C_{-2}$ | low |
| $C_{-1}$ | low |
| $C_0$ | high. |

Decoder may assume that the three low correlation blocks (−3, −2, −1) were derandomized correctly.

However, if the next block derandomized has a low correlation, the correlations of the four-derandomized blocks may be as follows:

| | |
|---|---|
| $C_{-3}$ | low |
| $C_{-2}$ | low |
| $C_{-1}$ | low |
| $C_0$ | low. |

The decoder may assume that the oldest block (−3) was incorrectly derandomized and will explore the oldest block's alternative derandomizations to find the next-most-likely candidate for derandomization. In one embodiment, it is only when all four blocks have low correlation values that the alternatives for the oldest block may be examined. In alternate embodiments, a greater or lesser number of low correlation blocks may be used or a combination of low and high correlations of varying number.

The invention has been described in conjunction with the preferred embodiment. It is evident that numerous alternatives, modifications, variations and uses will be apparent to those skilled in the art in light of the foregoing description.

What is claimed is:

1. A method for explicitly transmitting a block attribute of a block of data comprising:
   transforming determined bits of the data to correspond to the value of the block attribute, wherein the determined bits represented quantization codes, and the block attribute is a quantization bit and is recoverable from the transformed determined bits.

2. The method as set forth in claim 1, wherein transforming is selected from the group comprising of:
   combining the determined bits of the data with a shuffling value to create transformed determined bits that correspond to the value of the block attribute;
   combining the determined bits of the data with a shuffling value to create transformed determined bits that equal the value of the block attribute;
   selecting a sequence to combine with the determined bits of the data to create transformed determined bits that correspond to the value of the block attribute; and
   replacing the determined bits of the data with a corresponding value of the block attribute.

3. The method as set forth in claim 1, wherein transforming comprises:
   selecting a data sequence that generates the value of the block attribute at the determined bits when combined with the determined bits of the data.

4. The method as set forth in claim 3, wherein selecting selects one of a plurality of data sequences, and further comprising:
   generating the plurality of data sequences corresponding to different possible values of the determined bits.

5. The method as set forth in claim 4, wherein generating a plurality of data sequences comprises:
   providing a seed value for pseudo-randomly generating a data sequence, the seed value determined by an ID value corresponding to a value that generates the block attribute when combined with the determined bits of the data;
   pseudo-randomly generating a plurality of pseudo-random data sequences using the seed value; and
   selectively replacing the determined bits with one of the possible values.

6. The method as set forth in claim 3, further comprising:
   combining the determined bits of the data with the selected data sequence according to an operation selected from the group consisting of logically combining, mathematically combining, shuffling, pseudo-randomizing and exclusive-ORing.

7. The method as set forth in claim 3, wherein the data sequence is selected based upon information selected from the group consisting of state information, state information regarding data sequences previously selected, and selected data of a current block and selected data for at least one other block.

8. The method as set forth in claim 7, wherein at least one other block is selected from the group consisting of prior blocks and subsequent blocks.

9. The method as set forth claim 7, wherein selecting a data sequence for the current block of data is performed in accordance with a seed value, and further comprising:
   establishing the seed value using selected data of the current block and selected data of at least one other block.

10. The method as set forth in claim 9, further comprising:
    initializing the seed value for a first block of data.

11. The method as set forth in claim 3, wherein selecting comprises:
    establishing a seed value using data of a current block and at least one other block; and
    inputting the seed value into a pseudo-random number generator to generate a pseudo-randomized sequence of data.

12. The method as set forth in claim 1, wherein data is selected from the group consisting of two-dimensional static images, hologram images, three-dimensional static images, video, two-dimensional moving images, three dimensional moving images, monaural sound, and N-channel sound.

13. The method as set forth in claim 1, wherein the block of data is encoded by Adaptive Dynamic Range Coding, and further comprising transforming bits of the data to correspond to the value of another block attribute selected from the group consisting of motion flag, minimum value, maximum value, central value, and quantization codes.

14. A method for explicitly transmitting a block attribute of a block of image data comprising pixels comprising:
  transforming determined bits of the pixel data to correspond to the value of the block attribute, wherein the determined bits represent quantization codes, and the block attribute is a quantization bit and is recoverable from the transformed determined bits.

15. The method as set forth in claim 14, wherein transforming is selected from the group consisting of:
  combining the determined bits of the data with a shuffling value to create transformed determined bits that correspond to the value of the block attribute;
  combining the determined bits of the data with a shuffling value to create transformed determined bits that equal the value of the block attribute;
  selecting a sequence to combine with the determined bits of the data to create transformed determined bits that correspond to the value of the block attribute; and
  replacing the determined bits of the data with a corresponding value of the block attribute.

16. The method as set forth in claim 14, wherein transforming comprises:
  selecting a data sequence that generates the value of the block attribute at the determined bits when combined with the determined bits of the data.

17. The method as set forth in claim 16, further comprising:
  combining the determined bits of the data with the selected data sequence according to an operation selected from the group consisting of logically combining, mathematically combining, shuffling, pseudo-randomizing and exclusive-ORing.

18. The method as set forth in claim 16, wherein the data sequence is selected based upon information selected from the group consisting of state information, state information regarding data sequences previously selected, and selected data of a current block and selected data for at least one other block.

19. The method as set forth in claim 18, wherein at least one other block is selected from the group consisting of prior blocks and subsequent blocks.

20. The method as set forth in claim 18, wherein selecting a data sequence for the current block of data is performed in accordance with a seed value, and further comprising:
  establishing the seed value using selected data of a current block and selected data of at least one other block.

21. The method as set forth in claim 20 further comprising:
  initializing the seed value for a first block of data.

22. The method as set forth in claim 16, wherein selecting comprises:
  establishing a seed value using data of the current block and at least one other block; and
  inputting the seed value into a pseudo-random number generator to generate a pseudo-randomized sequence of data.

23. The method as set forth in claim 14, wherein data is selected from the group consisting of two-dimensional static images, hologram images, three-dimensional static images, video, two-dimensional moving images, three dimensional moving images, monaural sound, and N-channel sound.

24. The method as set forth in claim 14, wherein the block of image data is encoded by Adaptive Dynamic Range Coding, and further comprising transforming bits of the data to correspond to the value of another block attribute selected from the group consisting of motion flag, minimum value, maximum value, central value, and quantization codes.

25. A method for decoding data comprising:
  retrieving a quantization bit block attribute from transformed determined bits of the data, wherein the determined bits represent quantization codes;
  generating a plurality of candidate decodings of the data; and
  selecting one of the plurality of candidate decodings as the decoded data.

26. The method as set forth in claim 25, wherein generating comprises:
  providing a plurality of sequences that produces candidate decodings when combined with the data.

27. The method as set forth in claim 26, wherein providing is selected from the group consisting of:
  accessing a group of predetermined sequences; and
  generating a plurality of pseudo-random sequences using a seed value.

28. The method as set forth in claim 26, wherein a seed value is generated based upon prior seed values.

29. The method as set forth in claim 25, wherein selecting is performed based upon a confidence metric.

30. The method as set forth in claim 29, wherein if a best confidence metric of a plurality of confidence metrics generated for the plurality of candidate decodings is less than a threshold, repeatedly choose a next-best decoding for an oldest block of a group of prior blocks and a current block, and re-decode later blocks of the group until the confidence metric for the current block is greater than or equal to the threshold.

31. An apparatus configured to explicitly transmitting a block attribute of a block of data comprising:
  a transformer configured to transform determined bits of the data to correspond to the value of the block attribute, wherein the determined bits represent quantization codes, and the block attribute is a quantization bit and is recoverable from the transformed determined bits.

32. The apparatus as set forth in claim 31, wherein transformer is selected from the group consisting of:
  a first combiner configured to combine the determined bits of the data with a shuffling value to create transformed determined bits that correspond to the value of the block attribute;
  a second combiner configured to combine the determined bits of the data with a shuffling value to create transformed determined bits that equal the value of the block attribute;
  a selector configured to select a sequence to combine with the determined bits of the data to create transformed determined bits that correspond to the value of the block attribute; and
  a replacer configured to replace the determined bits of the data with a corresponding value of the block attribute.

33. The apparatus as set forth in claim 31, wherein the transformer is configured to select a data sequence that generates the value of the block attribute at the determined bits when combined with the determined bits of the data.

34. The apparatus as set forth in claim 33, wherein the transformer is configured to select one of a plurality of data sequences, and further comprising:
  a sequence generator configured to generate the plurality of data sequences corresponding to different possible values of the determined bits.

35. The apparatus as set forth in claim 34, wherein the sequence generator comprises:
 an input configured to receive a seed value, the seed value determined by an ID value corresponding to a value that generates the block attribute when combined with the determined bits of the data;
 a pseudo-random number generator configured to generate a plurality of pseudo-random data sequences using the seed value; and
 a replacer configured to replace the determined bits with values that is one of the possible values.

36. The apparatus as set forth in claim 33, further comprising:
 combining the determined bits of the data with the selected data sequence according to an operation selected from the group consisting of logically combining, mathematically combining, shuffling, pseudo-randomizing and exclusive-ORing.

37. The apparatus as set forth in claim 33, wherein the data sequence is selected based upon information selected from the group consisting of state information, state information regarding data sequences previously selected, and selected data of a current block and selected data for at least one other block.

38. The apparatus as set forth claim 37, wherein at least one other block is selected from the group consisting of prior blocks and subsequent blocks.

39. The apparatus as set forth claim 37, wherein the transformer is further configured to select a data sequence for the current block of data in accordance with a seed value and further comprising:
 a seed generator configured to establish the seed value using selected data of the current block and selected data of at least one other block.

40. The apparatus as set forth in claim 39, wherein the seed generator is further configured to initialize the seed value for a first block of data.

41. The apparatus as set forth in claim 33, wherein the transformer comprises:
 a seed generator configured to establish a seed value using data of the current block and at least one other block; and
 a pseudo-random number generator configured to receive the seed value and generate a pseudo-randomized sequence of data.

42. The apparatus as set forth claim 31 wherein data is selected from the group consisting of two-dimensional static images, hologram images, three-dimensional static images, video, two-dimensional moving images, three dimensional moving images, monaural sound, and N-channel sound.

43. The apparatus as set forth in claim 31 wherein the block of data is encoded by Adaptive Dynamic Range Coding, and further comprising transforming bits of the data to correspond to the value of another block attribute selected from the group consisting of motion flag, minimum value, maximum value, central value, and quantization codes.

44. A decoder configured to decode data comprising:
 an extractor configured to retrieve a quantization bit block attribute from transformed determined bits of the data, wherein the determined bits represent quantization codes;
 a reverse transformer configured to generate a plurality of candidate decodings of the data and select one of the plurality of candidate decodings as the decoded data.

45. The apparatus as set forth in claim 44, wherein the reverse transformer is further configured to provide a plurality of sequences that produces candidate decodings when combined with the data.

46. The apparatus as set forth in claim 45, wherein the reverse transformer is configured to provide a plurality of sequences in accordance with a mechanism selected from the group consisting of:
 access a group of predetermined sequences; and
 generate a plurality of pseudo-random sequences using a seed value.

47. The apparatus as set forth in claim 45, wherein a seed value is generated based upon prior seed values.

48. The apparatus as set forth in claim 44, wherein the reverse transformer is configured to select based upon a confidence metric.

49. The apparatus as set forth in claim 48, wherein if a best confidence metric of a plurality of confidence metrics generated for the plurality of candidate decodings is less than a threshold, the reverse transformer repeatedly chooses a next-best decoding for an oldest block of a group of prior blocks and a current block, and re-decodes later blocks of the group until the confidence metric for the current block is greater than or equal to the threshold.

50. A computer readable medium comprising instructions, which when executed by a processor, explicitly transmit a block attribute of a block of data, the instructions comprising:
 transforming determined bits of the data to correspond to the value of the block attribute, wherein the determined bits represent quantization codes, and the block attribute is a quantization bit and is recoverable from the transformed determined bits.

51. The computer readable medium as set forth in claim 50, wherein transforming is selected from the group consisting of:
 combining the determined bits of the data with a shuffling value to create transformed determined bits that correspond to the value of the block attribute;
 combining the determined bits of the data with a shuffling value to create transformed determined bits that equal the value of the block attribute;
 selecting a sequence to combine with the determined bits of the data to create transformed determined bits that correspond to the value of the block attribute; and
 replacing the determined bits of the data with a corresponding value of the block attribute.

52. The computer readable medium as set forth in claim 50, wherein transforming comprises:
 selecting a data sequence that generates the value of the block attribute at the determined bits when combined with the determined bits of the data.

53. The computer readable medium as set forth in claim 52, wherein selecting selects one of a plurality of data sequences, and further comprising instructions, which when executed by a processor, generate the plurality of data sequences corresponding to different possible values of the determined bits.

54. The computer readable medium as set forth in claim 53, wherein generating a plurality of data sequences comprises:
 providing a seed value for pseudo-randomly generating a data sequence, the seed value determined by an ID value corresponding to a value that generates the block attribute when combined with determined bits of the data;

pseudo-randomly generating a plurality of pseudo-random data sequences using the seed value; and selectively replacing the determined bits with values that is one of the possible values.

55. The computer readable medium as set forth in claim 52, further comprising instructions, which when executed by a processor, combine the determined bits of the data with the selected data sequence according to an operation selected from the group consisting of logically combining, mathematically combining, shuffling, pseudo-randomizing and exclusive-ORing.

56. The computer readable medium as set forth in claim 52, wherein the data sequence is selected based upon information selected from the group consisting of state information, state information regarding data sequences previously selected, and selected data of a current block and selected data for at least one other block.

57. The computer readable medium as set forth in claim 56, wherein at least one other block is selected from the group consisting of prior blocks and subsequent blocks.

58. The computer readable medium as set forth in claim 56, wherein selecting a data sequence for the current block of data is performed in accordance with a seed value, and further comprising instructions, which when executed by a processor, establish the seed value using selected data of the current block and selected data of at least one other block.

59. The computer readable medium as set forth in claim 58, further comprising instructions, which when executed by a processor, initialize the seed value for a first block of data.

60. The computer readable medium as set forth in claim 52, wherein selecting comprises:
    establishing a seed value using data of the current block and at least one other block; and
    inputting the seed value into a pseudo-random number generator to generate a pseudo-randomized sequence of data.

61. The computer readable medium as set forth in claim 50, wherein data is selected from the group consisting of two-dimensional static images, hologram images, three-dimensional static images, video, two-dimensional moving images, three dimensional moving images, monaural sound, and N-channel sound.

62. The computer readable medium as set forth in claim 50, wherein the block of data is encoded by Adaptive Dynamic Range Coding, and further comprising transforming bits of the data to correspond to the value of another block attribute selected from the group consisting of motion flag, minimum value, maximum value, central value, and quantization codes.

63. A computer readable medium comprising instructions, which when executed by a processor, perform a decoding of data, the instructions comprising:
    retrieving a quantization bit block attribute from transformed determined bits of the data, wherein the determined bits represent quantization codes;
    generating a plurality of candidate decodings of the data;
    selecting a candidate decoding of the plurality of candidate decodings as the decoded data.

64. The computer readable medium as set forth in claim 63, wherein generating comprises:
    providing a plurality of sequences that produces candidate decodings when combined with the data.

65. The computer readable medium as set forth in claim 64, wherein providing is selected from the group consisting of:
    accessing a group of predetermined sequences; and
    generating a plurality of pseudo-random sequences using a seed value.

66. The computer readable medium as set forth in claim 64, wherein a seed value is generated based upon prior seed values.

67. The computer readable medium as set forth in claim 63, wherein selecting is performed based upon a confidence metric.

68. The computer readable medium as set forth in claim 67, wherein if a best confidence metric of a plurality of confidence metrics generated for the plurality of candidate decodings is less than a threshold, repeatedly choose a next-best decoding for an oldest block of a group of prior blocks and a current block, and re-decode later blocks of the group until the confidence metric for the current block is greater than or equal to the threshold.

69. An apparatus for explicitly transmitting a block attribute of a block of data comprising:
    means for identifying determined bits in the data; and
    means for transforming the determined bits to correspond to the value of the block attribute, wherein the determined bits represent quantization codes, and the block attribute is a quantization bit and is recoverable from the transformed determined bits.

70. The apparatus as set forth in claim 69, wherein the means for transforming is selected from the group consisting of:
    means for combining the determined bits of the data with a shuffling value to create transformed determined bits that correspond to the value of the block attribute;
    means for combining the determined bits of the data with a shuffling value to create transformed determined bits that equal the value of the block attribute;
    means for selecting a sequence to combine with the determined bits of the data to create transformed determined bits that correspond to the value of the block attribute; and
    means for replacing the determined bits of the data with a corresponding value of the block attribute.

71. The apparatus as set forth in claim 69, wherein the means for transforming comprises:
    means for selecting a data sequence that generates the value of the block attribute at the determined bits when combined with the determined bits of the data.

72. An apparatus for decoding data comprising:
    means for retrieving a quantization bit block attribute from transformed determined bits of the data, wherein the determined bits represent quantization codes;
    means for generating a plurality of candidate decodings of the data; and
    means for selecting one of the plurality of candidate decodings as the decoded data.

73. The apparatus as set forth in claim 72, wherein the means for generating comprises:
    means for providing a plurality of sequences that produces candidate decodings when combined with the data.

* * * * *